United States Patent
Berry et al.

[15] 3,679,727
[45] July 25, 1972

[54] ALLYL CARBONATE AND SUBSTITUTED ALLYL CARBONATE ESTERS OF 1,4-DIALKYLOL CYCLOHEXANE, AND POLYMERS THEREOF

[72] Inventors: David A. Berry, Columbus; Gilbert M. Gynn, Hilliard, both of Ohio

[73] Assignee: Dart Industries Inc., Los Angeles, Calif.

[22] Filed: July 22, 1969

[21] Appl. No.: 843,831

[52] U.S. Cl. ............260/463, 260/17.4 CL, 260/41 A, 260/41 AG, 260/77.5 UA
[51] Int. Cl. ............C07c 69/00, C08f 3/52, C08f 37/16
[58] Field of Search .................................260/463

[56] References Cited

UNITED STATES PATENTS 2,384,115   9/1945   Muskat et al. ...........................260/78
3,205,256   9/1965   Stumpf .................................260/463

OTHER PUBLICATIONS

Chemical Abstracts 64, 17,717 c (1966)

*Primary Examiner*—Lewis Gotts
*Assistant Examiner*—Diana G. Rivers
*Attorney*—Fred S. Valles and Richard A. Dannells, Jr.

[57] ABSTRACT

Disubstituted cyclohexane compositions designated as either bis(2-alkylallylcarbonyldioxy) 1,4-dialkylene cyclohexane or bis(2-arylallylcarbonyldioxy) 1,4-dialkylene cyclohexane represented by the formula:

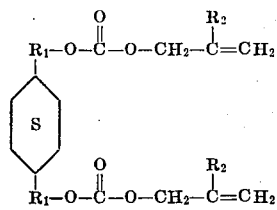

wherein $R_1$ is a lower alkyl and $R_2$ is hydrogen or an alkyl, aryl, aralkyl or alkaryl hydrocarbon radical, are useful in the production of polymers and copolymers. Compositions containing these polymers and copolymers when combined with the proper filler have outstanding stain resistance as well as excellent impact resistance and other strength properties when compared with prior art compositions recognized as outstanding for use in dinnerware.

2 Claims, No Drawings

ALLYL CARBONATE AND SUBSTITUTED ALLYL CARBONATE ESTERS OF 1,4-DIALKYLOL CYCLOHEXANE, AND POLYMERS THEREOF

BACKGROUND OF THE INVENTION

1. Field of the Invention

This invention is directed to a novel class of monomers and polymers and to a method for their preparation. More particularly, the invention relates to disubstituted cyclohexane monomers and polymers thereof.

The polymers and copolymers derived from the monomeric compositions of this invention when reinforced with certain types of fibrous materials such as cellulose, glass and polyester fibers, have been found to be ideal for use in dinnerware, i.e., flatware including cups, saucers, plates and the like, and in laminated table, bar and counter tops.

2. Description of the Prior Art

Melamine-formaldehyde resins which have Description widespread use in molded articles, such as dinnerware, have as their major disadvantage that of being susceptible to various kinds of stains from coffee, tea, fruit and vegetable juices of all types, soft drinks and the like. It would be desirable, if new compositions were available that have the same impact resistance and other strength properties as the conventional melamine-type resinS, but are more stain resistant.

SUMMARY OF THE INVENTION

Polymers derived from the disubstituted cyclohexane monomers of this invention when filled with certain fibrous materials and converted to molded articles have high impact resistance and hardness and have greatly improved stain resistance when compared to the prior art compositions.

An object of the present invention is to provide monomers and polymers thereof for use in molding compounds and the like. Another object of this invention is to provide a process for producing monomeric intermediates for producing thermosetting resins useful in dinnerware and laminated table tops.

The present invention provides a disubstituted cyclohexane composition represented by the formula:

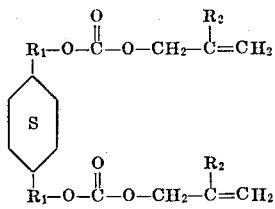

wherein $R_1$ is a lower alkyl and $R_2$ is hydrogen or alkyl, aryl, aralkyl or alkaryl hydrocarbon radical.

The monomeric compositions of this invention are prepared by reacting (1) a 1,4-dialkanol cyclohexane having the formula:

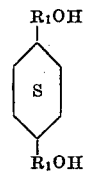

wherein $R_1$ is a lower alkyl having one to five carbon atoms; and (2) allyl haloformate or a substituted allyl haloformate having the formula:

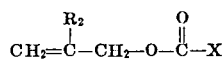

wherein $R_2$ is H or an alkyl, aryl, aralkyl or alkaryl hydrocarbon radical and X is chloro, bromo or iodo. The reaction is carried out in the presence of an acid acceptor at a temperature in the range of about −5° to about 25° C and a pressure of atmospheric up to 100 psig for a period of one-half hour to several hours. A suitable acid acceptor is pyridine, although other organic bases can be used such as collidine and dimethyl aniline as well as quaternary bases, e.g., trimethyl phenyl ammonium hydroxide and inorganic bases, e.g., sodium hydroxide.

The reaction is illustrated by the following equation:

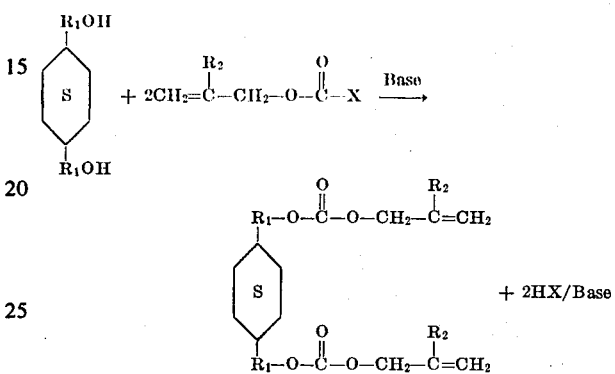

As indicated by the above equation, the reactants are generally mixed in the stoichiometrical proportion of 2 moles of the substituted allyl haloformate to 1 mole of the dialkanol cyclohexane. However, the reaction can be suitably carried out using 2 to 5 moles of the haloformate to 1 mole of the dialkanol cyclohexane.

PREFERRED EMBODIMENTS OF THIS INVENTION

In the preferred monomeric composition of this invention, $R_1$ is a $C_1$ alkyl and $R_2$ is H resulting in a structure designated as bis(allylcarbonyldioxy) 1,4-dimethylene cyclohexane:

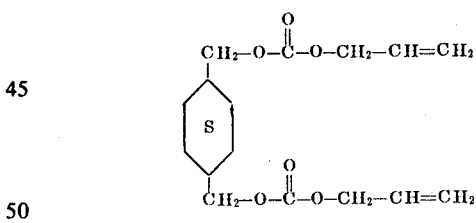

Other compositions contemplated by this invention and illustrated by specific examples include the following compositions:

bis(2-octylallylcarbonyldioxy) 1,4-dimethylene cyclohexane:

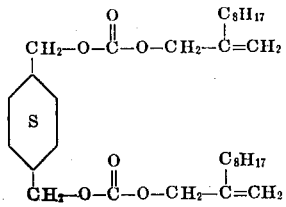

bis(2-phenylallylcarbonyldioxy) 1,4-dimethylene cyclohexane:

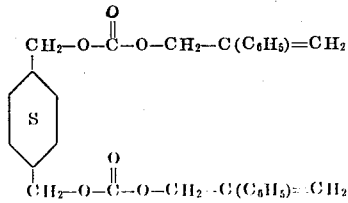

bis(2-p-methyl phenylallylcarbonyldioxy) 1,4-dimethylene cyclohexane:

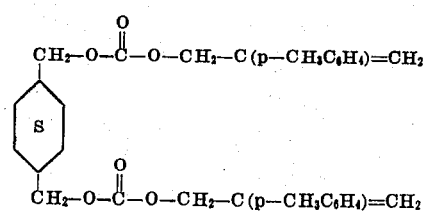

Homopolymers and copolymers derived from the disubstituted cyclohexane monomeric compositions are also provided in accordance with this invention. The disubstituted cyclohexane monomers of this invention polymerize in the presence of a free-radical initiator to form a cross-linked, thermosetting resin.

The disubstituted cyclohexane monomers of this invention are prepolymerized in the presence of a suitable solvent such as dioxane with a suitable initiator, i.e., a peroxide initiator such as di-tertiary butyl perbenzoate, ditertiary butyl peroxide, di-benzoyl peroxide, dilauroyl peroxide, cyclohexanone peroxide, tertiary-butyl hydroperoxide, di-acetyl peroxide, dibenzoyl peroxide, cumene hydroperoxide, dicumyl peroxide and the like, at a temperature of about 25° to 160° C. for a sufficient period of time to polymerize 10 to 50 weight percent, preferably 20 to 35 weight percent of the monomer to prepolymer. The resulting prepolymer product solution is then cooled and precipitated with a non-solvent and the resulting product is separated from the liquid phase and dried.

A molding composition is then prepared from the prepolymer by intimately blending about 25 to 75 weight percent of the prepolymer of the bis(2-alkylallylcarbonyldioxy) 1,4-dialkylene cyclohexane or bis(2-arylallylcarbonyldioxy) 1,4-dialkylene cyclohexane and at least 25 weight percent of one or more reinforcing fillers. The reinforcing fillers comprise about 10 to 40 weight percent of a primary filler and 0 to 40 weight percent of a secondary filler. The primary filler consists of alpha cellulose, glass fibers or polyester fibers or mixtures thereof. The secondary filler consists of clay, calcium carbonate, magnesium, or silica powder or mixtures thereof.

A particularly preferred composition of this invention which is especially suitable for dinnerware applications consist of:
  a. at least 35 weight percent of the polymer which consists of at least 50 percent of bis(allylcarbonyldioxy) 1,4-dimethylene cyclohexane,
  b. about 10 to 40 weight percent of alpha cellulose, and
  c. about 10 to 40 weight percent of silica powder, wherein the total of the (b) and (c) components are equal to at least 40 percent based on the weight of the final composition. This particular composition has been found to have a stain resistance of less than 10 expressed as a color change in $R_d$ units on the Gardner Color Difference Meter. A specific example of these compositions and results therefrom are set forth in the examples below.

Copolymers derived from the disubstituted cyclohexane monomeric compositions of this invention have also been found to have great utility in molding compositions and the like. Typical comonomers that can be copolymerized by the same method described above, with the disubstituted cyclohexane monomers of this invention include vinyl aromatics, diallyl carbonates, diallyl phthalates, derivatives thereof and the like. Typical vinyl aromatics include styrene, alpha-methylstyrene, vinyltoluene and substituted styrene and mixtures thereof. The copolymeric compositions comprise 50 to 90 percent by weight of bis(2-alkylallylcarbonyldioxy) or bis(2-arylcarbonyldioxy) 1,4-dialkylene cyclohexane and 10 to 50 percent by weight of the foregoing comonomers.

The molding compositions are prepared by dissolving the prepolymer of the disubstituted cyclohexane or the copolymer derived therefrom in a suitable solvent such as acetone. To the resulting solution is added the desired filler, one or more of the peroxide initiators and a metallic stearate as a processing aid such as zinc, magnesium, calcium and sodium stearate. In addition to these components, other components which can be added to incorporate them into the compositions of this invention include pigments, delustrants, plasticizers, flame retardant materials and other materials known in the art to modify the chemical and physical properties of the finished molding compositions.

The mixture resulting from the combination of the above components is allowed to dry to remove the solvent. The resulting solid composition can then be ground or otherwise reduced into discrete particles and sold as a molding compound or molded into the desired articles.

The examples below illustrate the method of preparation of the compositions of the present invention, their subsequent polymerization and copolymerization and their blending with fillers to produce molding compounds.

EXAMPLE 1

This example illustrates the preparation of the bis(allylcarbonyldioxy) 1,4-dimethylene cyclohexane monomeric composition in which 144.2 grams (1 mole) of 1,4-dimethylol cyclohexane and 250 grams (3.16 moles) of pyridine were charged to a vessel equipped with a stirrer, thermometer and dropping funnel. After the 1,4-dimethylol cyclohexane was dissolved in the pyridine and the temperature of the solution was cooled to 3° C., allyl chloroformate was continuously added to the solution by means of the dropping funnel over a period of about 4½ hours while the reaction temperature was maintained at a temperature in the range of 5° to 8° C. with constant agitation. The reaction was continued for a period of one hour at temperatures in the range of 3° to 5° C. after the addition of a total of 253.1 grams (2.1 moles) of allyl chloroformate. The product mixture was then allowed to warm up to room temperature, i.e., about 22° C., and 700 ml of distilled water containing about 10 grams of NaCl were added to the reaction mixture. The resulting dimethylene cyclohexane product was separated, washed with distilled water and dried over $CaCl_2$. The product was purified by a vacuum distillation at temperatures ranging from 156° C. at about 2 mm Hg to 184° C. at 7.8 mm Hg. The product was repurified by redistilling under the same vacuum conditions to form a light yellow liquid which crystallized upon standing at room temperature. The resulting product was found to have a hydroxyl number of 97 KOH/gm of product.

EXAMPLE 2

The 14-dimethylol cyclohexane and allylchloroformate were reacted as described in Example 1 and the resulting reaction product was filtered leaving a brownish-orange filtrate. The filtrate was vacuum distilled to obtain a clear yellow liquid product having a boiling point of 145° C. at 0.7 mm Hg with crystallized on standing at room temperature.

200 grams of the resulting product was dissolved in 200 grams of 1,4-dioxane containing 8 grams of benzoyl peroxide. The reaction mixture was heated from 25° to 70° C. in about 2 hours and maintained at 70° to 80° C. for about 2 hours to prepolymerize about 24 percent by weight of the monomer. The product mixture was cooled to 0°–20° C. and mixed with methanol at 0°–20° C. to precipitate the dimethylene cyclohexane prepolymer. The solid prepolymer was separated from the liquid phase and repeatedly redissolved in acetone to remove all of the solvent. The polymer was then dried, ground into a pale yellow powder which was further dried in a vacuum oven for 2 days.

EXAMPLE 3

This example illustrates the preparation of a filled molding composition containing the prepolymer obtained from Example 2. 48 grams (about 70.8 percent based on the weight of the final composition) of the dimethylene cyclohexane prepolymer of Example 2 were dissolved in 35 grams of acetone. The following components were then added to the solution: 1.44 grams of $TiO_2$ pigment, 0.98 grams of zinc stearate to serve as a processing aid, 1.44 grams of t-butyl perbenzoate and 16 grams (about 23.6 percent based on the weight of the final composition) of alpha cellulose flock sold under the trade name "Solka Flock SW 40" and blended in an Atlantic Research Twin-Cone Mixer.

The resulting mixture was dried in a warm vacuum chamber for about 16 hours to remove the acetone. The dried material was then further blended in a two-roll rubber mill for a period of about 5 minutes until it was well mixed. The resulting material was then broken into small pieces and compression molded at a temperature of about 320° F. and a pressure of 4,000 psi. Compression molded samples were prepared by placing the resulting material in molds under the above conditions for periods of 2, 4 and 6 minutes, respectively, and found to have average Rockwell Hardness values on the "M" Scale in the range of 84 to 87. In addition, cups were molded from the composition of this example and measured for coffee stain resistance. The coffee stain-resistance test comprised placing samples of the moldings in a bath of coffee containing two teaspoons/cup of fresh instant coffee at 180° F. for a period of 48 hours. The degree of staining was measured by determining the color of the samples before and after exposure to the coffee bath with a Gardner Color Difference Meter. The cups from the composition of this Example resulted in a final color change of 8.0 expressed in $R_d$ units which measures whiteness, from the specimen's initial color. This color change can be compared to the color change of about 43 for articles molded from standard melamine-formaldehyde resins.

EXAMPLE 4

This example illustrates the preparation of a copolymer containing 90 weight percent of the disubstituted cyclohexane composition and 10 weight percent of diallyl carbonate. Eight grams of benzoyl peroxide was dissolved in 200 grams of dioxane to which was added 180 grams of the dimethylene cyclohexane monomer of Example 1. Twenty grams of diallyl carbonate monomer were then slowly added to the solution. The solution was heated from 22° to 75° C. in two hours and maintained at a temperature in the range of about 75° to 85° C. for a period of 2½ hours to copolymerize about 28% by weight of the comonomers to the copolymer. The product mixture was cooled to 30° C and mixed with methanol at 0° C. to precipitate the copolymer. The solid copolymer was then separated from the liquid phase and dried.

EXAMPLE 5

This example illustrates the preparation of a molding composition following the same procedure as Example 3 above except that the copolymer formed by the procedure of Example 4 was blended into the formulation set forth in Table I below:

TABLE I

| COMPONENTS | GRAMS |
|---|---|
| Copolymer | 50 (70.7%)* |
| Acetone | 75 |
| $TiO_2$ | 1.5 |
| Zinc Stearate | 1.0 |
| t-butyl perbenzoate | 1.5 |
| Alpha cellulose | 16.7 (23.6%)* |
| Total | 145.7 |

*Based on the weight of the final composition

The resulting mixture was compression molded at about 300° F. and 3,200 psi for 2, 4, 6 and 8 minutes, respectively, and was found to have average Rockwell Hardness values on the "M" Scale in the range of about 99 to 102. Compression molded samples of compositions of this example at 6 minute mold times were immersed in coffee containing 98 grams of fresh instant coffee in 7,000 ml of water for a period of 48 hours results indicated a final color change of 4.8 expressed in $R_d$ units by the Gardner Color Difference Meter.

EXAMPLE 6

This example illustrates a molding composition in which the dimethylene cyclohexane prepolymer formed by the procedure of Example 2 was blended with a primary and a secondary filler. The same procedure followed in Example 3 was followed in this example to produce a molding composition having the formulation set forth in the table below:

| COMPONENTS | GRAMS |
|---|---|
| Prepolymer* | 38.0 (45.5%)*** |
| Acetone | 75.0 |
| $TiO_2$ | 3.6 |
| Zinc Stearate | 0.5 |
| t-butyl perbenzoate | 1.0 |
| Silica Flour** | 27.0 (32.3%)*** |
| Alpha cellulose | 13.5 (16.17%)*** |
| Total | 158.6 |

*Prepolymer of bis(allylcarbonyldioxy) 1,4-dimethylene cyclohexane by procedure of Example 2.
**Having a 325 mesh screen analysis by U.S. Standard Sieve Analysis.
***Based on the weight of the final composition.

Compression molded samples of the compositions of this example at mold times of 2, 4 and 6 minutes, respectively, were found to have average Rockwell Hardness values in the range of 80 to 81. Compression molded samples at 6 minute mold times were placed in the same coffee bath as indicated in Example 5 and were found to have color difference on the $R_d$ Scale of 9.5.

The foregoing examples have shown the unexpected utility of the novel monomeric compositions of this invention. In particular, they show the unexpected improvement in the stain resistance of the compositions when incorporated into molding compositions as compared with standard commercial grades of melamine-formaldehyde resins. In addition, the hardness values for the present compositions are on the same high level as the melamine-type resins which make them ideally suited for dinnerware applications.

What is claimed is:

1. A disubstituted cyclohexane composition represented by the formula:

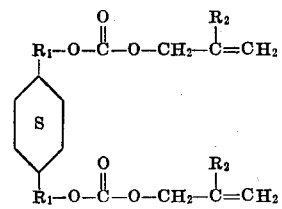

wherein $R_1$ is a lower alkyl and $R_2$ is hydrogen or an alkyl, aryl, aralkyl or alkaryl hydrocarbon radical.

2. The composition of claim 1 wherein $R_1$ is a $C_1$ alkyl and $R_2$ is hydrogen.

* * * * *